US012574332B2

(12) United States Patent
Sethia et al.

(10) Patent No.: US 12,574,332 B2
(45) Date of Patent: Mar. 10, 2026

(54) SYSTEMS AND METHODS FOR HOMOMORPHIC ENCRYPTION-BASED DATA CACHING

(71) Applicant: BANK OF AMERICA CORPORATION, Charlotte, NC (US)

(72) Inventors: Maneesh Sethia, Telangana (IN); Abhijit Behera, Hyderabad (IN); Shailendra Singh, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 356 days.

(21) Appl. No.: 18/371,755

(22) Filed: Sep. 22, 2023

(65) Prior Publication Data

US 2025/0106171 A1      Mar. 27, 2025

(51) Int. Cl.
| | |
|---|---|
| *H04L 47/50* | (2022.01) |
| *G06F 9/48* | (2006.01) |
| *G06Q 20/20* | (2012.01) |
| *H04L 9/00* | (2022.01) |

(52) U.S. Cl.
CPC .............. *H04L 47/50* (2013.01); *G06F 9/485* (2013.01); *G06Q 20/20* (2013.01); *H04L 9/008* (2013.01)

(58) Field of Classification Search
CPC ......... H04L 47/50; H04L 9/008; G06F 9/485; G06Q 20/20
See application file for complete search history.

(56) References Cited

U.S. PATENT DOCUMENTS

| | | | |
|---|---|---|---|
| 7,689,661 | B2 | 3/2010 | Lowery |
| 7,694,076 | B2 | 4/2010 | Lowery |
| 7,991,736 | B2 | 8/2011 | McBride |
| 8,229,968 | B2 | 7/2012 | Wang |
| 9,218,290 | B2 | 12/2015 | Sonnier |
| 10,021,696 | B2 | 7/2018 | Kalmbach |
| 10,467,136 | B2 | 11/2019 | Choi |
| 10,893,120 | B2 | 1/2021 | Seelam |
| 11,716,406 | B2 | 8/2023 | Huang |
| 2005/0240732 | A1 | 10/2005 | Crick |
| 2007/0055647 | A1 | 3/2007 | Mullins |
| 2011/0055202 | A1 | 3/2011 | Heimendinger |
| 2013/0297886 | A1 | 11/2013 | Hyde, II |
| 2014/0156777 | A1 | 6/2014 | Subbiah |
| 2014/0223106 | A1 | 8/2014 | Shivashankaraiah |
| 2015/0134754 | A1 | 5/2015 | Lauer |
| 2016/0224256 | A1 | 8/2016 | Callaway |

(Continued)

*Primary Examiner* — Elton Williams
(74) *Attorney, Agent, or Firm* — Moore & Van Allen PLLC; Nicholas C. Russell

(57) ABSTRACT

The present disclosure details systems and methods for homomorphic encryption-based data caching. This technology detects transaction patterns via a monitoring module that liaises with both a payment system and an entity system. Prior to its processing, transaction data is encrypted with a homomorphic encryption module. A dynamic interface, aligned with a local point-of-sale (POS) cache, prioritizes data based on current transaction metrics. If a recipient server is busy, the transaction data is rerouted, stored in the POS's local cache, and queued. The transaction's success is gauged against a predefined cut-off time. Unsuccessful transactions within this window are slated for batch processing, yet resource processing proceeds while awaiting this batch processing.

20 Claims, 6 Drawing Sheets

(56) References Cited

U.S. PATENT DOCUMENTS

| | | | |
|---|---|---|---|
| 2017/0257452 A1 | 9/2017 | Hoiles | |
| 2017/0286294 A1 | 10/2017 | Trika | |
| 2021/0227011 A1 | 7/2021 | Long | |
| 2021/0382831 A1* | 12/2021 | Sun | G06F 16/2315 |

* cited by examiner

SYSTEMS AND METHODS FOR HOMOMORPHIC ENCRYPTION-BASED DATA CACHING

TECHNOLOGICAL FIELD

Example embodiments of the present disclosure relate to systems and methods for homomorphic encryption-based data caching.

BACKGROUND

In conventional systems, there may be instances wherein a user initiates a transaction at a merchant's Point of Sale (POS), but, due to server congestion at the recipient bank, the transaction fails to execute, necessitating the customer to resort to alternative methods. In certain scenarios, the user's account is debited, yet the merchant's account remains uncredited due to server congestion at the recipient entity. The customer remains uninformed about whether they need to reattempt the transaction and may need to liaise with their bank to initiate a reversal.

As such, applicant has identified a number of deficiencies and problems associated with transaction data caching. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for homomorphic encryption-based data caching. The proposed technical solution introduces an intelligent and secure method, along with associated apparatus, designed to cache payment payloads within a local Point of Sale (POS) network, all while leveraging homomorphic encryption for enhanced security. This method incorporates predictive capabilities that estimate potential latency in the payment network, relying on real-time transaction queue volume data through a Long Short-Term Memory (LSTM) neural network. These real-time predictions are then used to cluster payment payloads that may face potential failure. Furthermore, the system generates the configuration of the local database cache dynamically, selecting parameters such as Time to Cache/Time to Live based on the volume of payment payloads. The implementation of homomorphic encryption ensures the security of payment payload caching within the local network, effectively mitigating chance of payment payload hacking or tampering.

In terms of the technical steps, the procedure ensures that customer payments at the merchant's POS are processed successfully, regardless of the recipient bank server's current status. The payment is queued and retries are attempted for up to 10 minutes (cutoff period). The intelligent AI-based POS system predicts payment latency based on real-time transaction volume, enabling the creation of a local database cache that persistently attempts payment success until the defined cutoff time. Dynamic caching strategies are implemented, adjusting to transaction volume fluctuations. The use of homomorphic encryption secures the payment payload within the local cache. Routing mechanisms facilitate payment processing, and in cases of persistent failure, payments are batched for reconciliation. Once the recipient bank server is available, it accepts payments and provides updates for payment processing to the merchant. This intelligent technique continually monitors the recipient payment server's status and directs payments through the appropriate route. Moreover, the intelligent POS machine dynamically manages the local network, determining which devices are part of the local network.

The benefits of implementing this solution are substantial. It effectively eliminates failed payments attributed to recipient bank server issues, ensuring that all customer payments are processed as merchants receive their payments once the bank server resumes its operations. When the system senses potential issues, either through the predictions of a neural net or other internal sensors, it does not halt the payment process. Instead, an intelligent queuing mechanism is activated. Payments, when facing potential delays, are flagged and are put in a queue. They are kept in this state till a stable connection is re-established or the recipient server becomes responsive. If a transaction does not successfully process within a predefined time (e.g., the 10-minute cut-off, or the like), it is earmarked for batch processing. This ensures that transactions are processed eventually without overwhelming or straining a recipient server.

By combining homomorphic encryption, intelligent prediction of latency, an intelligent POS localized network, a dedicated local cache for payment payloads, and an agile payment queuing system, the present invention creates a robust, efficient, and user-centric payment processing environment. Even amidst potential server issues or network issues, end-users enjoy a consistent and seamless payment experience.

In some embodiments, the invention generally includes the steps of detecting transaction patterns via a monitoring module in communication with both a payment system and an entity system; encrypting transaction data via a homomorphic encryption module to encrypt transaction data for a transaction prior to processing the transaction data; generating a dynamic cache optimization interface with a local point-of-sale (POS) cache, wherein the dynamic cache optimization interface prioritizes data availability based on real-time transaction loads and patterns; detecting a recipient server as busy, and based on detecting the recipient server as busy, deferring the transaction data to a payment routing mechanism, storing the transaction data in a local database cache of the POS system, and queuing the transaction; determining, based on a predefined cut-off time, whether the transaction achieves success; upon determining that the transaction does not achieve success based on the predefined cut-off time, queuing the transaction for batch processing; and executing processing of resources according to the transaction while the transaction is queued for batch processing.

In some embodiments, the homomorphic encryption module homomorphically encrypts the transaction data such that computations on the transactional data can be conducted while the transaction data remains encrypted.

In some embodiments, the dynamic cache optimization interface maintains a local cache specifically for the transaction loads and patterns.

In some embodiments, the local point-of-sale (POS) cache is dynamically adjusted based on both a current transactional volume and a predictive analysis.

In other embodiments, a long short-term memory (LTSM) neural net continually refines a prediction of server latency or transaction delay of the entity system based on a blend of historical data and real-time data.

In still further embodiments, upon detecting the recipient server as busy, the system further analyzes a cause for the server being busy and employs an adaptive retry mechanism that adjusts the time intervals between subsequent transaction attempts.

In some embodiments, the payment routing mechanism employs a multi-path routing algorithm, selecting optimal routes for transaction data based on network congestion, server availability, and transaction priority levels.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
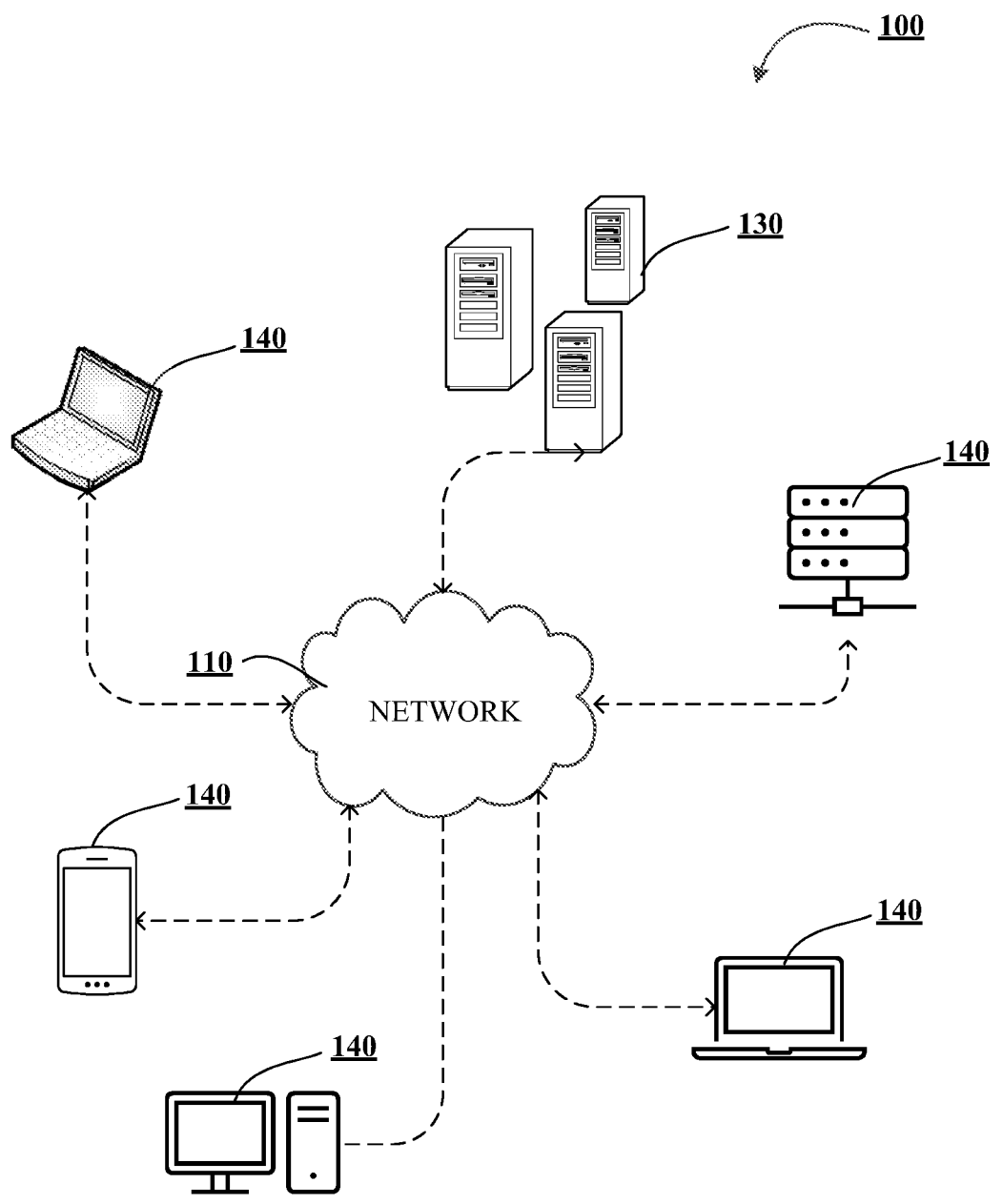
Figure 1B:
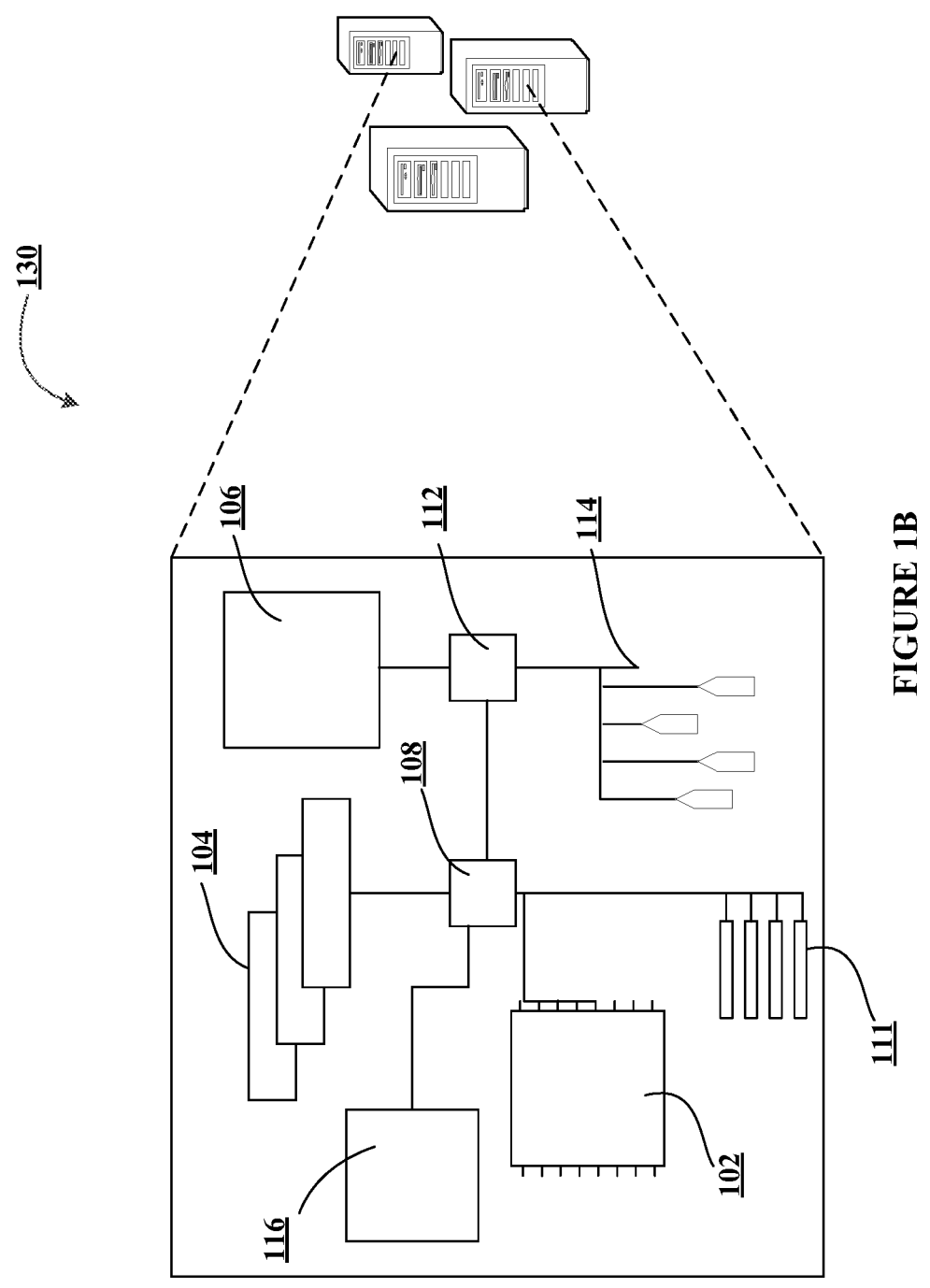
Figure 1C:
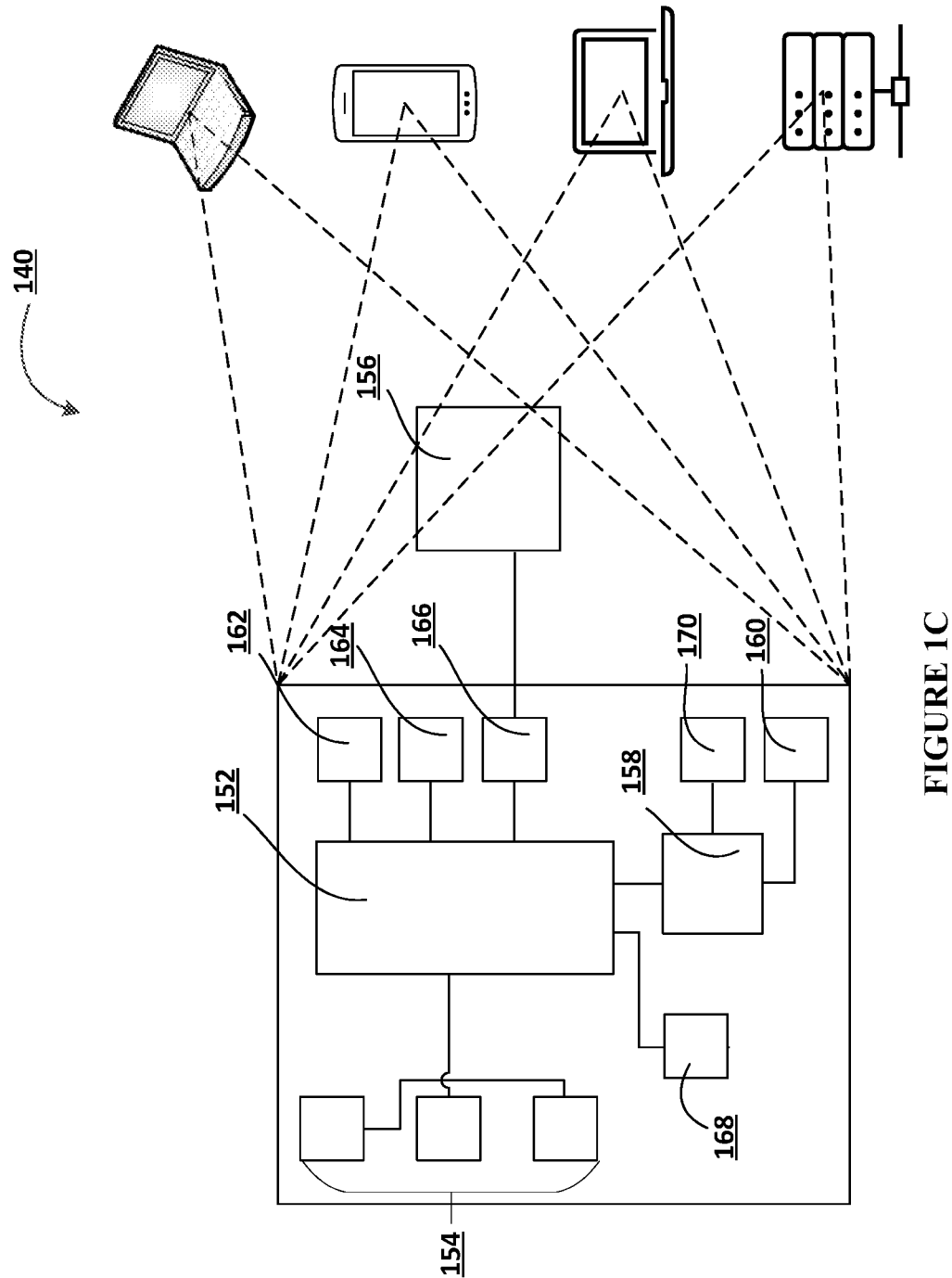
Figure 2:
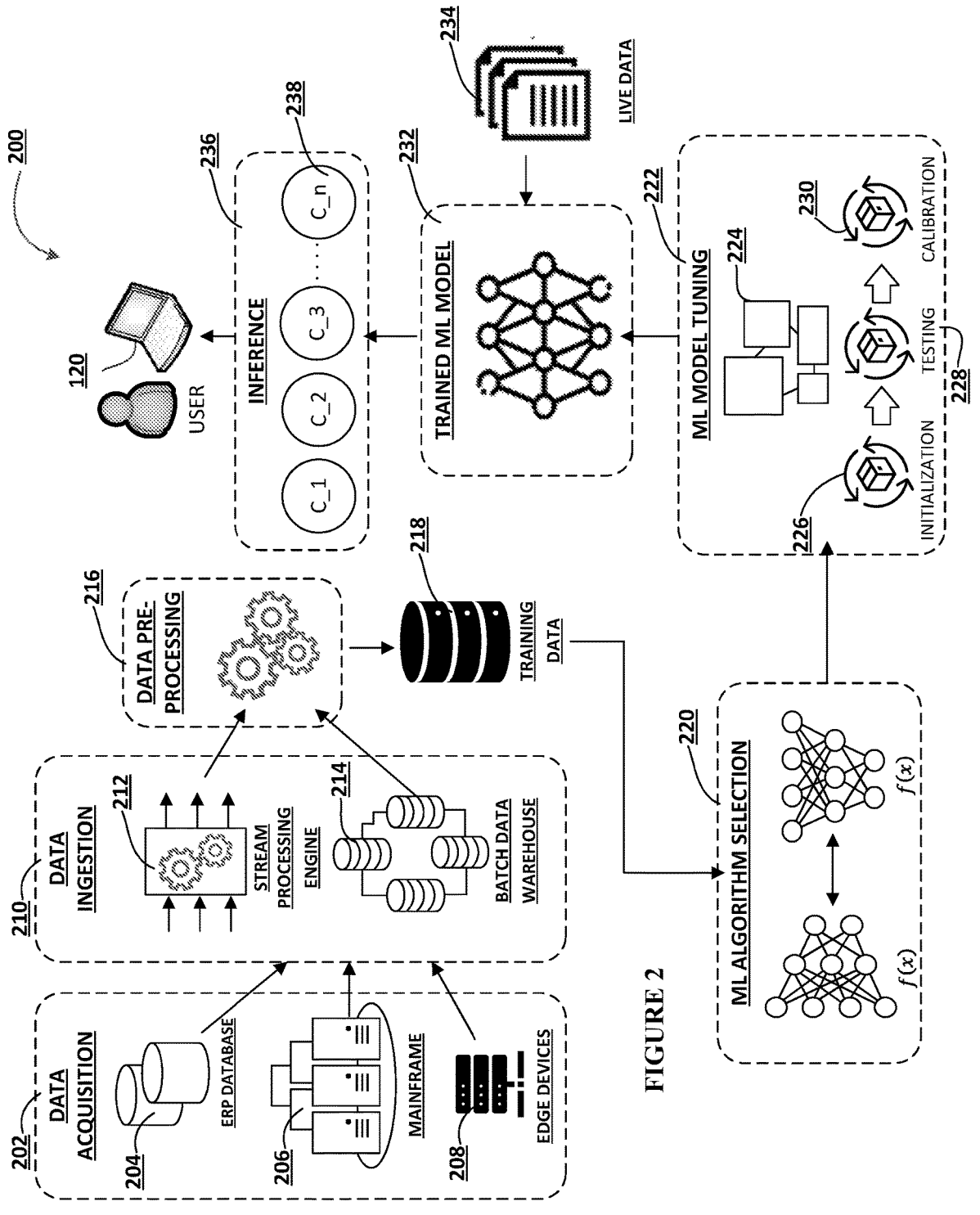
Figure 3:
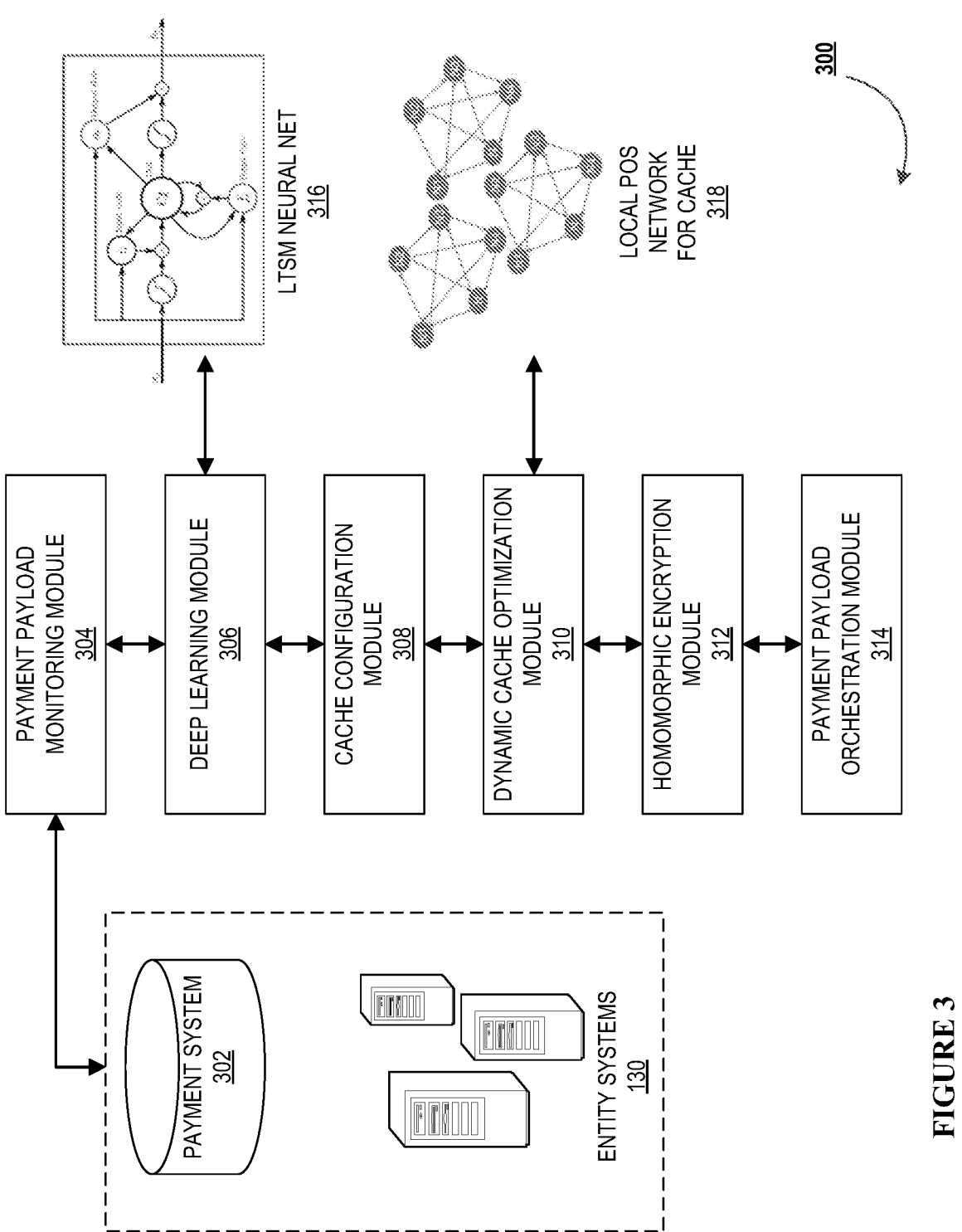
Figure 4:
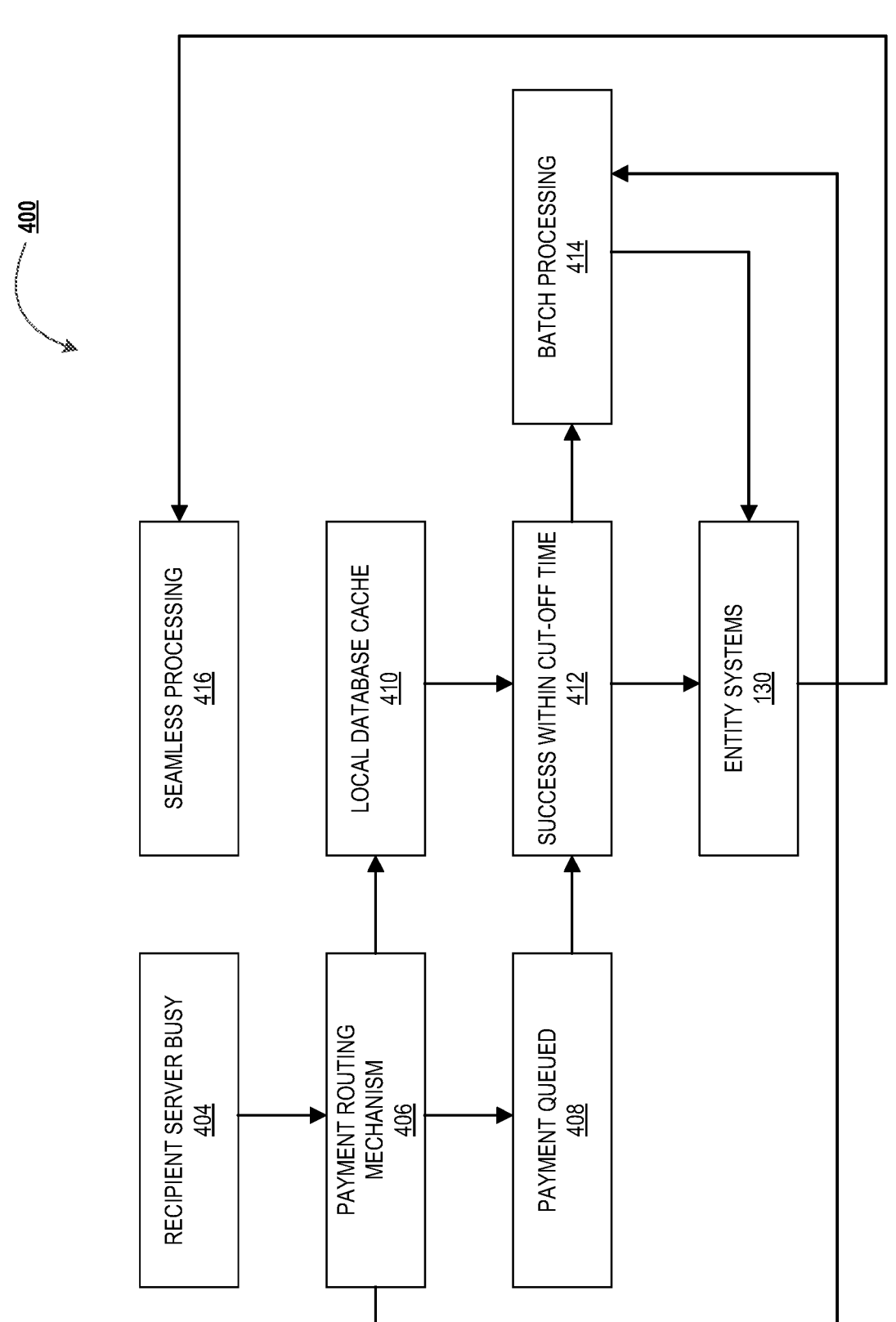

FIGS. 1A-1C illustrates technical components of an exemplary distributed computing environment for homomorphic encryption-based data caching, in accordance with an embodiment of the disclosure;

FIG. 2 illustrates an exemplary machine learning (ML) subsystem architecture 400, in accordance with an embodiment of the invention;

FIG. 3 illustrates a process flow for homomorphic encryption-based data caching, in accordance with an embodiment of the disclosure; and FIG. 4 illustrates a process flow for homomorphic encryption-based data caching, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "homomorphic encryption" or "homomorphic encryption module" may refer to an advanced encryption technique allowing computations on encrypted data without decrypting it first. This encryption approach ensures that the results of calculations on the encrypted data, once decrypted, match the results of the same operations if they were performed on the raw data. The homomorphic encryption module might not be a standalone device but could be integrated software or algorithms embedded within a larger system, such as in data protection suites, cloud computing environments, or data analytics platforms.

As used herein, "local database cache" refers to a temporary storage location residing within or in close network proximity to a particular system or device, optimized for rapid data retrieval. This cache temporarily retains frequently accessed or recently accessed data to reduce the need for repeated data fetching from the main database, thereby improving performance speeds. The local database cache might not be a distinct hardware component but could manifest as integrated memory sections or software layers within a larger system infrastructure, such as within point-of-sale (POS) systems, server environments, or user-end devices.

As used herein, "dynamic cache optimization interface" refers to a software or hardware module that intelligently manages and adjusts the caching strategy in real-time. This interface actively evaluates and prioritizes the data stored within a cache based on current transaction loads, user requirements, or system demands. While its primary function is to enhance data accessibility and system responsiveness, the dynamic cache optimization interface may utilize algorithms or predictive analyses to foresee future data needs or transaction patterns. This proactive approach ensures efficient resource utilization, with the interface dynamically adjusting cache configurations to accommodate varying operational scenarios, reducing latency, and ensuring optimal performance. In some embodiments, a dynamic cache optimization interface may employ the use of a long short-term memory (LTSM) neural net.

As used herein, "long short-term memory (LTSM) neural net" refers to a specialized architecture within the realm of recurrent neural networks (RNNs). Unlike traditional RNNs, the LTSM is uniquely structured to remember patterns and sequences over extended periods. It consists of memory cells and multiple gate mechanisms, enabling it to both retain essential information and forget non-essential details, ensuring improved learning from sequences of data. In various applications, the LTSM neural net can analyze, predict, and categorize time-series or sequential data. Its capabilities prove particularly advantageous in scenarios where understanding the context or chronology of events, such as in transactional flows or predicting server latencies, is crucial for optimal system performance.

The present disclosure offers a multifaceted solution. It utilizes the power of homomorphic encryption to ensure transactional data is secure at all times, even during processing. Through the use of LTSM (Long Short-Term Memory) neural net, the present invention accurately predicts potential latencies or system bottlenecks. If any hindrance is sensed, an intelligent Point Of Sale (POS) system is employed to create a localized network for faster processing. Moreover, the system strategically uses local caches to store payment data, guaranteeing rapid access. An agile payment queuing mechanism ensures that no transaction is left hanging; they are either processed immediately or flagged for batch processing at an opportune moment.

What is more, the present disclosure provides a technical solution to a technical problem. As described herein, the technical problem revolves around delays in payment processing, potential inaccuracies, and a heightened chance of breaches. The technical solution presented allows for swifter and more accurate payment processing, even in the face of potential bottlenecks. Specifically, the solution offers an efficient alternative to the issues surrounding payment latency. It achieves this by: (i) utilizing fewer steps, thus conserving computing resources like processing power, storage space, and network bandwidth, (ii) providing a more precise method, reducing the recourse to rectify inaccuracies stemming from lag-induced errors, (iii) automating the system to eliminate manual input, increasing the transactional speed and reducing wastage, (iv) optimally determining and deploying the necessary resources, minimizing network congestion and unnecessary resource allocation. moreover, this innovative approach introduces specific computational methods and processes previously absent, cutting down redundant steps and ensuring optimal use of available resources.

FIGS. 1A-1C illustrate technical components of an exemplary distributed computing environment 100 for homomorphic encryption-based data caching, in accordance with an embodiment of the disclosure. As shown in FIG. 1A, the distributed computing environment 100 contemplated herein may include an entity system 130, an end-point device(s) 140, and a network 110 over which the entity system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to entity system 130, with each system providing portions of the necessary operations (e.g., as a server bank, a group of blade servers, or a multi-processor system).

In some embodiments, the entity system 130 and the end-point device(s) 140 may have a client-server relationship in which the end-point device(s) 140 are remote devices that request and receive service from a centralized server, i.e., the entity system 130. In some other embodiments, the entity system 130 and the end-point device(s) 140 may have a peer-to-peer relationship in which the entity system 130 and the end-point device(s) 140 are considered equal and all have the same abilities to use the resources available on the network 110. Instead of having a central server (e.g., entity system 130) which would act as the shared drive, each device that is connect to the network 110 would act as the server for the files stored on it.

The entity system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the entity system 130 may be separated into two or more distinct portions.

FIG. 1B illustrates an exemplary component-level structure of the entity system 130, in accordance with an embodiment of the disclosure. As shown in FIG. 1B, the entity system 130 may include a processor 102, memory 104, input/output (I/O) device 116, and a storage device 110. The entity system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., entity system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the entity system 130 using any subsystems described herein. It is to be understood that the entity system 130 may use, as appropriate, multiple processors, along with multiple memories, and/or I/O devices, to execute the processes described herein.

The memory 104 stores information within the entity system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the entity system 130 during operation.

The storage device 106 is capable of providing mass storage for the entity system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the entity system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The entity system 130 may be implemented in a number of different forms. For example, the entity system 130 may be implemented as a standard server, or multiple times in a group of such servers. Additionally, the entity system 130 may also be implemented as part of a rack server system or a personal computer such as a laptop computer. Alternatively, components from entity system 130 may be combined with one or more other same or similar systems and an entire entity system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the entity system 130 via the network 110. Any communication between the entity system 130 and the end-point device(s) 140 may be subject to an authentication protocol allowing the entity system 130 to maintain security by permitting only authenticated users (or processes) to access the protected resources of the entity system 130, which may include servers, databases, applications, and/or any of the components described herein. To this end, the entity system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the entity system 130 (or other client devices) permissioned access to the protected resources of the end-point device(s) 140, which may include a GPS device, an image capturing component (e.g., camera), a microphone, and/or a speaker.

The end-point device(s) 140 may communicate with the entity system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the entity system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the entity system 130.

Various implementations of the distributed computing environment 100, including the entity system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 400, in accordance with an embodiment of the invention. FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/ or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

In an exemplary embodiment of the invention, the utilization of LSTM (Long Short-Term Memory) neural networks plays a pivotal role in predicting potential latency in the payment network based on real-time transaction queue volume. The LSTM network is an integral part of the system's architecture and is primarily implemented using a programming language such as Python, known for its robust machine learning libraries, including TensorFlow and PyTorch.

The LSTM neural network architecture employed in this system consists of recurrent neural network (RNN) units designed to capture sequential dependencies in the transaction data. These units are specialized in retaining information from previous time steps, making them suitable for modeling time-series data, such as transaction queue volumes. The input layer of the LSTM network takes in real-time data on transaction queue volumes, which serves as a time series input. The hidden layers consist of LSTM units, which are designed to remember and learn from previous data points in the time series. The network then employs a regression or prediction layer to estimate the potential latency in the payment network. This architecture allows the LSTM network to adapt to varying transaction volumes and make real-time predictions, which are critical for determining when and how to cache payment payloads effectively.

The process flow of this embodiment involves a continuous cycle of data input, processing, and prediction, as will be outlined in later Figures. Real-time data on transaction queue volumes is collected and fed into the LSTM neural network, which has been pre-trained on historical transaction data to learn patterns and dependencies. The LSTM network then processes this data, making predictions about potential latency in the payment network. These predictions are fed into the system's decision-making process, which determines the configuration of the local database cache and the dynamic caching parameters based on the LSTM's output. The use of LSTM neural networks enhances the system's adaptability and responsiveness, allowing it to predict and manage payment payload caching even in scenarios of fluctuating transaction volumes and server congestion, ultimately ensuring a seamless and efficient payment experience.

Incorporating the significant advantages of the Long Short-Term Memory (LSTM) neural networks, the machine learning subsystem 200 also integrates an LSTM processing unit, especially adept at handling time-series data. As mentioned earlier, LSTM neural networks are a form of recurrent neural network (RNN) units designed to remember and learn from sequential data, making them suitable for modeling real-time transaction queue volumes and predicting potential latencies, especially in payment networks. Given the sequential nature of the data from sources like edge devices, which might transmit real-time transactional data, LSTMs can play a crucial role in the processing pipeline.

Within the data pre-processing engine 216, the LSTM unit can operate effectively with data sourced from the data acquisition engine 202, especially when handling transaction queue volumes. This data is inherently sequential, allowing the LSTM to capture dependencies and anticipate possible payment network latencies. The LSTM's capability of retaining information from previous time steps makes it an ideal choice for such tasks. Furthermore, in the context of ML model tuning engine 222, the LSTM neural network architecture takes into account real-time data as its time series input. The network, through its hidden layers comprising LSTM units, learns from past data points in the sequence, enhancing the predictability of potential latencies in payment or transactional systems. The regression or prediction layer of the LSTM aids in the estimation of possible latency, which can then be integrated into the decision-making process of the machine learning subsystem 200.

The LSTM also enriches the inference engine 236, where real-time predictions based on the sequential nature of the transaction data can be rendered. The real-time predictions generated by the LSTM aid in configuring caching parameters dynamically, ensuring adaptability and responsiveness to changes in transaction volumes and potential server congestion. This ensures that any decisions made by the inference engine 236 are highly informed, robust, and timely, accounting for dynamic changes in the transactional environment. Incorporating the LSTM networks into the machine learning subsystem 200 not only boosts the system's capacity to manage and predict data flow anomalies but also assures a streamlined, efficient user experience. This integration underlines the system's commitment to staying updated with cutting-edge technological advancements, ensuring unparalleled data processing and predictability. The addition of LSTM's capabilities fortifies the machine learning subsystem 200, enabling it to be more efficient, responsive, and adaptable, especially in environments characterized by time-series data and real-time transactional requirements.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for homomorphic encryption-based data caching, in accordance with an embodiment of the disclosure. In particular, FIG. 3 illustrates a detailed process flow that encompasses the interaction between multiple components within the context of a machine learning subsystem, specifically emphasizing a payment flow and its related components. The process begins with the payment system 302, which is designed to handle transactions, receive requests, and issue confirmations. This system can process payments originating from various platforms, be it online or offline transactions. The entity systems 130 acts as the main central database repository for transactions and include various data components that might be related to user data, transaction history, product catalog, and other pertinent, specific information. Entity system 130 is directly linked with the payment system 302 to provide necessary data to validate, authenticate, and process payments.

As payments are processed, the payment payload monitoring module 304 monitors over these transaction payloads. In the digital transaction ecosystem, a "payment payload" refers to a comprehensive set of data transmitted during a payment process. It encapsulates crucial information such as the payer's identification, payee details, transaction amount, payment method (credit card, bank transfer, digital wallet, or the like), timestamp, and often additional metadata pertinent to the transaction. This metadata might include location data, device information, user data, or the like. Collectively, this information forms the payment payload.

The payment payload monitoring module 304 serves as the nexus between the payment system 302 and the entity systems 130. This module is not a passive relay of information; it actively monitors and evaluates the details within every payload. By doing so, the payment payload monitoring module 304 can discern patterns from routine transactions and detect irregularities that might indicate malfeasance, system glitches, or other unexpected behaviors. Given the sensitivity and value of the data within the payment payload, ensuring its security is paramount. As data flows from a user device or point of transaction through various system layers to reach its final destination (e.g., the entity systems 130, or the like), there are points of potential data breach. This module, therefore, plays a dual role. While its primary objective is monitoring and pattern detection, it also acts as a protective mechanism, ensuring data integrity and protecting the transaction information from potential breaches, tampering, or unauthorized access.

Furthermore, by being in direct communication with both the payment system 302 and the entity systems 130, the payment payload monitoring module 304 can swiftly cross-verify transaction details with existing entity records. For example, if a payment seems to originate from an unrecognized device or an unfamiliar location, the module can cross-check this anomaly with the entity's past transaction history. If such anomalies persist or appear to be part of a larger pattern, the system could trigger alerts or even temporarily halt certain transactions to prevent potential malfeasance. In essence, the payment payload monitoring module 304 acts as a line of defense, ensuring every transaction is genuine, secure, and in line with established patterns and behaviors. It adapts, learns, and provides an additional layer of robustness to the entire payment process via the use of deep learning module 306.

To aid in the detection of anomalies and prediction of transactional trends, the deep learning module 306 is incorporated. This module utilizes the LTSM neural net 316, which, as discussed with regard to FIG. 2, is a specific type of recurrent neural network architecture optimized for sequences and time-series data. The deep learning module 306 continually learns from the transactional data, making it capable of forecasting future transaction patterns and aiding in real-time detection. The cache configuration module 308 is responsible for setting the rules and parameters for how data is cached within the system. Proper caching ensures that frequently used data is quickly accessible, optimizing overall system performance.

Seeing as delays, even of a few seconds, can lead to operational inefficiencies, the present system is specifically designed with an ability to quickly access and process transactional data. The cache configuration plays a pivotal role in facilitating this, acting as a high-speed data storage layer that provides rapid access to frequently used data and allowing transactions to be processed in a batch nature if the recipient entity is holding up the processing of a transaction.

As such, the dynamic cache optimization module 310 operates synergistically with the cache configuration to further enhance the system's performance. Through direct communication with the local POS (Point Of Sale) network for cache 318, the module possesses a real-time view of transaction activities across multiple terminals. This visibility allows it to actively monitor and evaluate the current transaction loads, patterns, and even peak usage times. With this data, the dynamic cache optimization module 310 can make informed, on-the-fly decisions regarding which pieces of transaction data should be stored in the cache and which should be relegated to longer-term storage. This dynamic approach ensures that frequently accessed or high-importance data is prioritized in the cache, allowing for more efficient retrieval and processing as compared to conventional systems.

Moreover, as the transaction landscape changes—with peak shopping times, special sales events, or unexpected surges in activity—the cache content must also adapt. Without the dynamic cache optimization module 310, the cache might become cluttered with outdated or less-relevant data, slowing down the system. By continuously optimizing and adjusting the cache based on real-time transactional patterns, the module ensures that the payment system remains agile, responsive, and efficient, regardless of fluctuating transaction volumes or shifting transactional trends. This proactive and adaptive caching mechanism is instrumental in delivering consistent, high-speed payment processing experiences to both merchants and end users.

Ensuring the security and privacy of transaction data is also of paramount importance. Traditionally, to perform any kind of meaningful computation on encrypted data, one of ordinary skill in the art would first have to decrypt it, process it, and then re-encrypt the results. However, this decryption step can expose sensitive information to vulnerabilities and potentially compromise the security of the data. For this reason, the present invention utilizes homomorphic encryption techniques. Homomorphic encryption is a form of encryption that allows computations to be carried out directly on encrypted data, without requiring it to be decrypted first. The results of such computations, when decrypted, are the same as if the operations had been performed on the raw, unencrypted data.

The homomorphic encryption module 312 utilizes this encryption technique to handle payment payloads. By doing so, sensitive information like payment details and other transaction metadata remain encrypted throughout the entire processing phase. For example, if there is a need to reconcile or further process this data during the process, this can be done directly on their encrypted transaction data without ever revealing the actual amounts of individual transactions. In the context of the present system, homomorphic encryption not only ensures that data remains confidential but also offers a level of flexibility and utility that traditional encryption methods cannot provide. The payment payload monitoring module 304, which actively monitors transaction patterns and details, can work seamlessly with the encrypted data, extracting insights and patterns without ever accessing the sensitive, raw data. This maintains system security, even during active monitoring and analysis.

For instance, in the event an anomaly in transaction patterns is detected, and a cross-verification is required with other system components, such as Entity systems 130, homomorphic encryption will allow this to occur without decrypting the data; with homomorphic encryption in place, this verification can be conducted without ever decrypting the user's personal and transaction details. The entire process retains a level of encryption, end-to-end, making it an exceptionally secure and private methodology for processing payments and monitoring transactions. In summary, the homomorphic encryption module 312 is not just an advanced security feature but a key component that allows for safe, encrypted computations, ensuring that the confidentiality of users' transaction data is upheld at every step of the process outlined herein.

Finally, the payment payload orchestration module 314 oversees the coordination and management of all payment-related data flow. This module ensures all components from the payment system 302 to the deep learning module 306 to the dynamic cache optimization module 310, work in sync and harmony, guaranteeing smooth, efficient, and secure payment processing. In an embodiment of the disclosed system, a payment routing mechanism integrates a multi-path routing algorithm designed to enhance transaction data handling. This specialized algorithm does not follow a single, predefined path to route transaction data. Instead, it constantly assesses the network environment in real-time, considering factors like network congestion, server availability, and the inherent priority of the transaction itself. Network congestion can often slow down or hinder data transmission. To counter this, the algorithm evaluates multiple paths, opting for the most efficient one at any given moment. Simultaneously, it verifies server availability, ensuring that the chosen route leads to a responsive and ready server, avoiding potential bottlenecks. Lastly, the system acknowledges that not all transactions hold the same urgency or importance. The algorithm, therefore, uses a set criterion to determine transaction priority levels, ensuring critical transactions are accorded the swiftest and most reliable routes, while less time-sensitive ones are efficiently processed without overwhelming the system. This adaptive multi-path approach ensures a more fluid, efficient, and reliable transaction processing experience. In implementing this sophisticated multi-path routing mechanism, certain coding languages and architectural designs are especially conducive. The system predominantly leverages Python and its extensive libraries, such as Scapy, for packet manipulation, and NetworkX for advanced routing algorithms. Python, known for its flexibility and vast library support, is ideal for handling dynamic routing adjustments on-the-fly. The asynchronous capabilities of Python's asyncio library further enhance the system's responsiveness, ensuring real-time evaluations of network states.

Underlying this, a microservices architecture, which may be containerized, provides necessary modularity. Each microservice, designed in a language best suited for its specific task, can be scaled independently, ensuring the system remains agile, even under varying loads. For instance, the server availability checking microservice, developed in Node.js for its event-driven, non-blocking I/O model, can rapidly ping multiple servers simultaneously, gauging their availability. Concurrently, the priority assignment microservice might utilize TensorFlow to assess transaction criticality, using past data to predict current transaction priority. Through the synergy of diverse programming languages and a modular architecture, the system efficiently manages and routes transaction data with high precision and reliability.

FIG. 4 illustrates a process flow for homomorphic encryption-based data caching, in accordance with an embodiment of the disclosure. FIG. 4 illustrates a detailed process flow related to payment transactions, specifically addressing scenarios where a recipient server might be overwhelmed or occupied. Initially, the system identifies when a recipient server is busy at step 404. When such a situation arises, the system defers the payment transaction to a payment routing mechanism at step 406. This mechanism plays a crucial role in determining the subsequent route or method of handling the payment.

Subsequently, the transaction information is stored in the local database cache of the POS system, as depicted in step 410. This acts as a buffer or interim storage, ensuring that the transaction data is preserved and can be reprocessed if needed. In parallel, the payment is queued, as illustrated in step 408. This ensures that payments are lined up in order and are not lost, especially in situations when the recipient server might be temporarily unavailable or overburdened. A crucial decision point arises when assessing if the payment achieves success within a predetermined cut-off time, represented by step 412. If the payment does manage to process successfully within this timeframe, the associated data or transaction details are either stored or relayed to various entity systems, labeled as 130. However, if the payment doesn't process within this stipulated cut-off time, it gets queued for batch processing, as shown in step 414. Here, multiple payments might be bundled together and processed as a single batch at a later time, ensuring efficiency and reducing the load on servers.

For instance, in an exemplary embodiment, a scenario may occur wherein the cut-off time for processing a payment transaction is defined at a precise 10-minute interval. Upon initiation of a resource transaction, the system's infrastructure, supported by the LTSM neural net, undergoes continuous monitoring of the transaction progression through a combination of RESTful APIs and WebSockets to ensure real-time communication. The LTSM neural net, leveraging TensorFlow and PyTorch libraries, will undergo training on extensive transaction datasets. Through this, it will have acquired the capability to discern transactional anomalies with a high degree of precision. As a payment is routed through the system, and the LTSM identifies latency patterns or recognizes signatures hinting at potential bottlenecks, such as an overwhelmed recipient server, it employs a callback function to notify the primary system.

In response to this notification, the system, written in an optimized combination of Java and Node.js, employs a strategy to mask any backend discrepancies. The transaction is instantaneously flagged in the PostgreSQL database of the POS as a 'deferred transaction' while utilizing asynchronous mechanisms like Promises or Async/Await. To the user, this results in an illusion of a typical payment cycle, devoid of disruptions, ensuring user satisfaction remains uncompromised. On the back end, Kafka message brokers queue this flagged transaction, maintaining a priority queue based on transaction timestamps. If the transaction does not reconcile within the delineated 10-minute window, it is earmarked for batch processing, ensuring eventual processing without overloading the recipient server bandwidth. Ultimately, irrespective of the route taken, the end goal of this entire process is to achieve seamless processing. This ideal state, where transactions are processed smoothly without any hitches or noticeable delays, is indicated in block 416.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for homomorphic encryption-based data caching, the system comprising:

a processing device;

a non-transitory storage device containing instructions when executed by the processing device, causes the processing device to perform the steps of:

monitoring transaction patterns in communication with both a payment system and an entity system;

encrypting transaction data via a homomorphic encryption module for a transaction prior to processing the transaction data;

generating a dynamic cache optimization interface with a local point-of-sale (POS) cache, wherein the dynamic cache optimization interface determines data availability based on real-time transaction loads and patterns;

detecting a recipient server as occupied, and deferring the transaction data to a payment routing mechanism, storing the transaction data in the local POS cache, and placing the transaction in a queue;

evaluating, based on a predefined cut-off time, if the transaction is successful;

if the transaction is determined to be unsuccessful within the predefined cut-off time, placing the transaction in a batch processing queue; and processing resources according to the transaction while it resides in the batch processing queue.

2. The system of claim 1, wherein the homomorphic encryption module encrypts the transaction data via a lattice-based encryption scheme such that additive and multiplicative computations on the transaction data can be conducted while the transaction data remains encrypted.

3. The system of claim 1, wherein the dynamic cache optimization interface maintains a local cache specifically for the real-time transaction loads and patterns.

4. The system of claim 1, wherein the local POS cache is dynamically adjusted based on both a current transactional volume and a predictive analysis.

5. The system of claim 1, wherein a long short-term memory (LTSM) neural net continually refines a prediction of server latency or transaction delay of the entity system based on a blend of historical data and real-time data.

6. The system of claim 1, wherein upon detecting the recipient server as busy, the system further analyzes a cause for the recipient server being busy and employs an adaptive retry mechanism that adjusts a time interval between subsequent transaction attempts.

7. The system of claim 1, wherein the payment routing mechanism employs a multi-path routing algorithm, selecting optimal routes for transaction data based on network congestion, server availability, and transaction priority levels.

8. A computer program product for homomorphic encryption-based data caching, the computer program product comprising a non-transitory computer-readable medium comprising code causing an apparatus to:

monitor transaction patterns in communication with both a payment system and an entity system;

encrypt transaction data via a homomorphic encryption module for a transaction prior to processing the transaction data;

generate a dynamic cache optimization interface with a local point-of-sale (POS) cache, wherein the dynamic cache optimization interface determines data availability based on real-time transaction loads and patterns;

detect a recipient server as occupied, and deferring the transaction data to a payment routing mechanism, storing the transaction data in the local POS cache, and placing the transaction in a queue;

evaluate, based on a predefined cut-off time, if the transaction is successful;

if the transaction is determined to be unsuccessful within the predefined cut-off time, place the transaction in a batch processing queue; and process resources according to the transaction while it resides in the batch processing queue.

9. The computer program product of claim 8, wherein the homomorphic encryption module encrypts the transaction data via a lattice-based encryption scheme such that additive and multiplicative computations on the transaction data can be conducted while the transaction data remains encrypted.

10. The computer program product of claim 8, wherein the dynamic cache optimization interface maintains a local cache specifically for the real-time transaction loads and patterns.

11. The computer program product of claim 8, wherein the local POS cache is dynamically adjusted based on both a current transactional volume and a predictive analysis.

12. The computer program product of claim 8, wherein a long short-term memory (LTSM) neural net continually refines a prediction of server latency or transaction delay of the entity system based on a blend of historical data and real-time data.

13. The computer program product of claim 8, further comprising, upon detecting the recipient server as busy, analyzing a cause for the recipient server being busy and employing an adaptive retry mechanism that adjusts a time interval between subsequent transaction attempts.

14. The computer program product of claim 8, wherein the payment routing mechanism employs a multi-path routing algorithm, selecting optimal routes for transaction data based on network congestion, server availability, and transaction priority levels.

15. A method for homomorphic encryption-based data caching, the method comprising:

monitoring transaction patterns in communication with both a payment system and an entity system;

encrypting transaction data via a homomorphic encryption module for a transaction prior to processing the transaction data;

generating a dynamic cache optimization interface with a local point-of-sale (POS) cache, wherein the dynamic cache optimization interface determines data availability based on real-time transaction loads and patterns;

detecting a recipient server as occupied, and deferring the transaction data to a payment routing mechanism, storing the transaction data in the local POS cache, and placing the transaction in a queue;

evaluating, based on a predefined cut-off time, if the transaction is successful;

if the transaction is determined to be unsuccessful within the predefined cut-off time, placing the transaction in a batch processing queue; and processing resources according to the transaction while it resides in the batch processing queue.

16. The method of claim 15, wherein the homomorphic encryption module encrypts the transaction data via a lattice-based encryption scheme such that additive and multiplicative computations on the transaction data can be conducted while the transaction data remains encrypted.

17. The method of claim 15, wherein the local POS cache is dynamically adjusted based on both a current transactional volume and a predictive analysis.

18. The method of claim 15, wherein a long short-term memory (LTSM) neural net continually refines a prediction of server latency or transaction delay of the entity system based on a blend of historical data and real-time data.

19. The method of claim 15, further comprising, upon detecting the recipient server as busy, analyzing a cause for the recipient server being busy and employing an adaptive retry mechanism that adjusts a time interval between subsequent transaction attempts.

20. The method of claim 15, wherein the payment routing mechanism employs a multi-path routing algorithm, selecting optimal routes for transaction data based on network congestion, server availability, and transaction priority levels.

* * * * *